(12) United States Patent
Gangwani et al.

(10) Patent No.: US 11,550,460 B1
(45) Date of Patent: Jan. 10, 2023

(54) SYSTEMS FOR LEVERAGING DEVICE ORIENTATION TO MODIFY VISUAL CHARACTERISTICS OF EDITS

(71) Applicant: Adobe Inc., San Jose, CA (US)

(72) Inventors: Amrita Gangwani, Jhansi (IN); Apoorva, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/514,806

(22) Filed: Oct. 29, 2021

(51) Int. Cl.
*G06F 3/04845* (2022.01)
*G06F 3/0346* (2013.01)

(52) U.S. Cl.
CPC ........ *G06F 3/04845* (2013.01); *G06F 3/0346* (2013.01)

(58) Field of Classification Search
CPC ............................ G06F 3/04845; G06F 3/0346
See application file for complete search history.

(56) References Cited

U.S. PATENT DOCUMENTS

| | | | |
|---|---|---|---|
| 11,221,750 B2* | 1/2022 | Krishnamurthy | G06T 19/20 |
| 2018/0004311 A1* | 1/2018 | Case, Jr. | G06F 3/03545 |
| 2020/0183506 A1* | 6/2020 | Tamura | G06F 3/0414 |
| 2021/0012574 A1* | 1/2021 | Fu | G06F 3/017 |

* cited by examiner

*Primary Examiner* — Priyank J Shah
(74) *Attorney, Agent, or Firm* — FIG. 1 Patents

(57) ABSTRACT

Device orientation techniques and systems are described to modify visual characteristics of edits that support the ability of a computing device to modify visual characteristics of digital objects appearing in a user interface of a mobile device based on orientation of the computing device, itself. A user interaction, for instance, is detected in a user interface of a device. Responsive to the detected user interaction, a multiaxial orientation of the device is determined. In some examples, the orientation is translated into tilt data such as in the form of altitude and azimuth values. A relative amount is calculated based on the orientation. The relative amount is applied to a visual characteristic of an edit to a digital object. Once the relative amount is applied, the digital object having the relative amount applied is displayed in the user interface.

20 Claims, 11 Drawing Sheets

US 11,550,460 B1

SYSTEMS FOR LEVERAGING DEVICE ORIENTATION TO MODIFY VISUAL CHARACTERISTICS OF EDITS

BACKGROUND

One of the foremost goals in content creation using mobile devices (e.g., cellular phones, tablet devices) is replication of the effects that can be accomplished with non-digital artistic media, i.e., a pencil and paper, canvas and brush, etc. Digital artists also desire to quickly and intuitively change visual characteristics to increase efficiency of using a mobile device for content creation. One conventional solution to this problem involves detecting the change in the angle or position of an "active" stylus containing electronic components or hardware. For instance, an active stylus may provide tilt data as an altitude and azimuth angle, which are subsequently used to change a corresponding device or stylus function.

However, use of an active stylus introduces additional complications for interaction with a mobile device. Some mobile devices, for instance, lack support for the use of an active stylus, a user may not have access to an active stylus at a given time, and so forth. As a result, the user is often forced to rely on a passive stylus (e.g., finger) and forgo corresponding functionality of an active stylus. For instance, a passive stylus is unable to replicate tilt data such as altitude and azimuth angle using conventional techniques. Thus, when using a finger or passive stylus, edits or changes to visual characteristics are selected manually, which is time-consuming, inaccurate, and frustrating to a user. Moreover, manual selection of desired edits or characteristics often do not accurately replicate non-digital artistic media and are not intuitive to a user and result in inefficient use of computational resources.

SUMMARY

Device orientation techniques and systems are described to modify visual characteristics of edits. This supports an ability of a computing device to modify visual characteristics of digital objects appearing in a user interface of a mobile device based on orientation of the computing device, itself. In an example, a user input is detected. An orientation of a computing device is also determined, e.g., using sensors of the computing device. In some examples, the orientation is translated to tilt data, such as in the form of altitude and azimuth values. A relative amount is calculated based on the orientation. The relative amount is then applied to a visual characteristic of an edit to a digital object which is displayed in the user interface. As a result, the orientation determination supports a broad range of functionality that is conventionally dependent on external hardware, thereby making this functionality available in situations that otherwise involved an active stylus and thus improve computing device operation.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
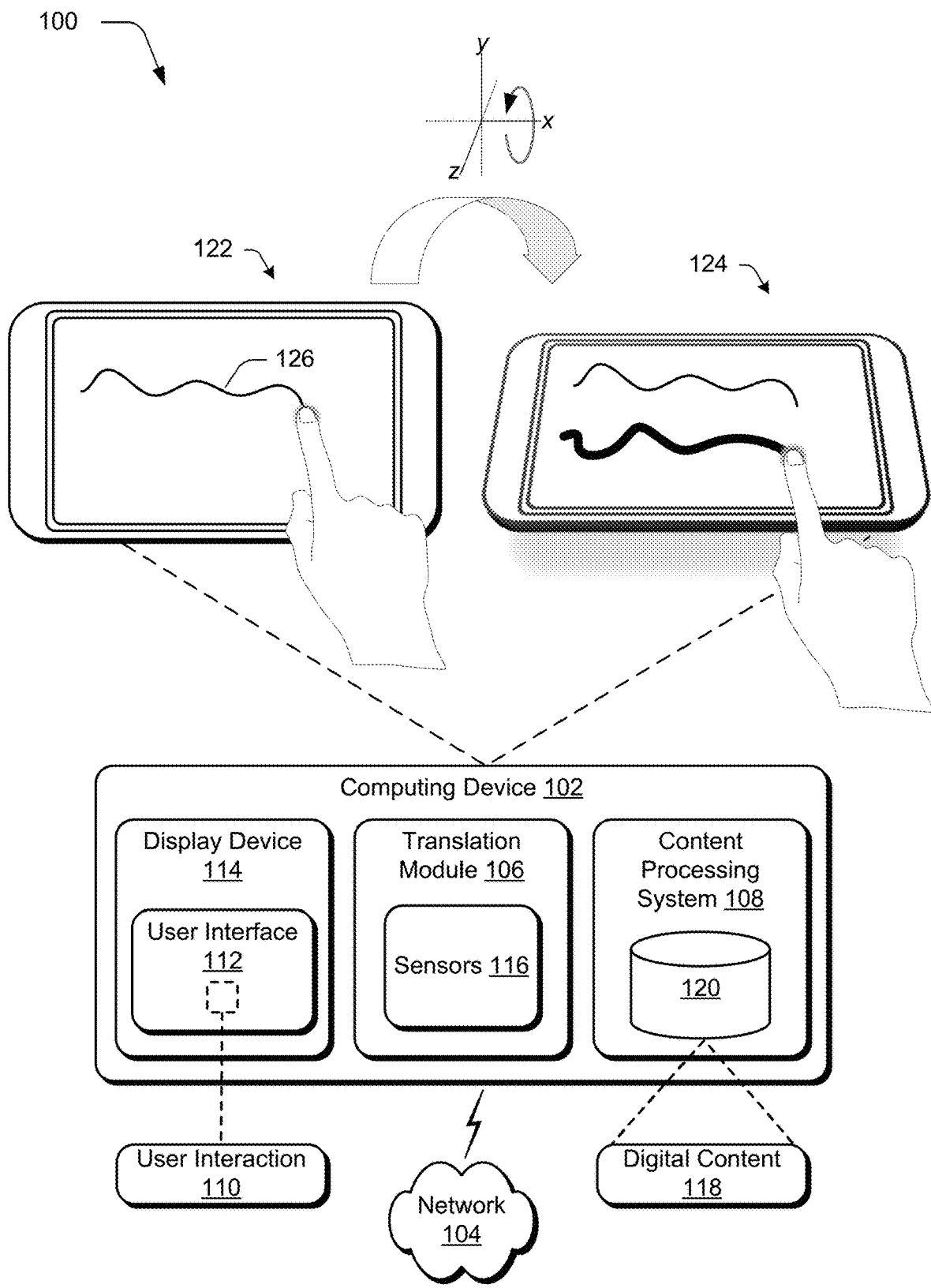
FIG. 1 is an illustration of an environment in an example implementation that is operable to employ digital systems and orientation techniques as described herein.

Mobile devices such as smartphones or tablets are often used for displaying user interfaces related to artistic content creation. Although mobile devices make conventional desktop functionality available in a wide range of mobile scenarios that otherwise would not be possible, techniques usable to access this functionality are limited by the mobile form factor of these devices. One such example involves use of illustrative tools to reproduce effects of non-digital artistic media, for instance those that look, feel, and act like real paintbrushes, pencils, pens, etc. To address these challenges, conventional techniques utilize an "active stylus" which includes integrated hardware or sensors. These active styluses are configured to use positional or angular sensors to change a corresponding device function or characteristic. However, active styluses add an additional device to be managed and utilized by digital content creators, are not supported by some computing device configurations, and so on. As such, active styluses are typically not available to digital content creators in a wide range of usage scenarios.

Alternatively, a user may use a passive input, e.g., a passive stylus or a finger. Because a finger or passive stylus lack embedded hardware, however, it is not possible to emulate the functionality of an active stylus using conventional techniques. Accordingly, a user is forced to manually select a desired edit or characteristic. However, this can be extremely frustrating and time consuming to a user as this involves repeated navigation through menus and tools to achieve a desired effect. For instance, it is difficult to create variable edits, such as those used to cause gradational changes, within a single stroke when using passive stylus or a finger. As such, manual selection of desired edits or characteristics often does not accurately replicate non-digital artistic media and are not intuitive for a user.

Accordingly, systems for leveraging device orientation to modify visual characteristics of edits are described that overcome conventional challenges and limitations by utilizing device orientation to achieve a wide range of functionality. In one example, a computing device detects a user interaction with a user interface of the computing device. For instance, a user is utilizing a digital drawing application on a smartphone, and the user interaction defines a stroke of a digital object. Responsive to the detected user interaction, an orientation of the computing device is determined.

The orientation of the computing device is determined by one or more sensors of the computing device. For instance, one or more of an accelerometer, passive infrared sensor, gyroscope, digital camera, ultrasonic sensor, microwave sensor, tomographic sensor, multiaxial sensor and/or any other type of device sensor are used to determine orientation. Utilizing sensors integrated within the computing device itself eliminates a conventional requirement for additional hardware components "outside" of the computing device, e.g., an active stylus as described above. Further, in some examples, the orientation determination includes use of a stabilization algorithm, e.g., to remove the risk of artifacts due to sudden changes in device orientation.

The orientation is definable in a variety of ways. In one example, the orientation describes an angle of the device in three-dimensional space. In another example, the orientation is determined as a difference between a reference orientation and a current orientation. Other examples are also contemplated, such as dimensional movement quantifications including pitch, roll, and yaw values. Pitch describes the rotation of the computing device about the x-axis. When a user is facing the screen of the computing device, for instance, pitch describes rotation towards or away from the user. Roll describes the rotation of the computing device about the y-axis, such as tilting the computing device about a vertical axis to the left or right. Yaw describes the rotation of the computing device about the z-axis. Where a user is facing the screen of the computing device, a clockwise or counterclockwise rotation of the computing device is described as the yaw. In some examples, the pitch, roll, and yaw are defined with respect to a device in a "portrait" configuration, while in other examples the pitch, roll and yaw are defined with respect to a device in a "landscape" configuration.

From the orientation, a relative amount is calculated. In some implementations, calculating the relative amount involves first translating the orientation into tilt data. The tilt data is representative of data that otherwise would be obtained from an active stylus, i.e., in the form of an altitude angle and azimuth angle detected by sensors of the active stylus. For instance, where the orientation is defined by a pitch, roll, and yaw, the orientation is translated to tilt data by mapping the pitch and roll of the computing device to the altitude angle and mapping the yaw to the azimuth angle. In some examples, the translation and calculation of a relative amount further include communicating the orientation or tilt data via an API, for instance via an API of an active stylus and thus leverage existing functionality of the computing device without making changes to that functionality. In other implementations, the orientation is directly used to calculate the relative amount, i.e., without first translating the orientation into tilt data.

Generally, the relative amount indicates a quantification related to the orientation of the computing device. The relative amount is applied to a visual characteristic of an edit to a digital object in the user interface. In some examples, the application of the relative amount to a visual characteristic of an edit includes communication via an API, for instance via a stylus API. Continuing the example from above, where a user is utilizing a digital drawing application on a smartphone and the user interaction defines a stroke of a digital object, the visual characteristic is a stroke attribute. A stroke attribute is any visual feature of a stroke, for instance a thickness, gradient, angle, opacity, hue, saturation, brightness, style, or RGB color value of a stroke. Once the relative amount is applied, the digital object having the relative amount applied to the visual characteristic is displayed in the user interface, e.g., to change the width, gradient, color, and so on.

Accordingly, as the orientation is changed in this example, the visual characteristic of an edit, in this case a stroke attribute, is modified to an extent determined by the relative amount. If the stroke attribute is thickness, for instance, the thickness of the stroke is changed as the orientation of the device changes. In this way, the techniques discussed herein expand functionality made available by the computing device by leveraging the device orientation without involving use of additional hardware devices (e.g., an active stylus) to achieve such functionality.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

EXAMPLE ENVIRONMENT

FIG. 1 is an illustration of a digital medium environment 100 in an example implementation that is operable to employ device orientation techniques described herein. The illustrated digital medium environment 100 includes a computing device 102 connected to a network 104. The computing device 102 is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 11.

The computing device 102 is illustrated as including a translation module 106 and a content processing system 108. The translation module 106 is implemented at least partially in hardware of the computing device 102 to process and translate a device orientation. Such processing is performable responsive to detecting a user interaction 110 in a user interface 112 of a display device 114. Responsive to the detecting a user input, an orientation is determined using one or more sensors 116 of the computing device 102.

The content processing system 108 is implemented at least partially in hardware of the computing device 102 to process and transform digital content 118, which is illustrated as maintained in storage 120 of the computing device 102. Such processing includes creation of the digital content 118, modification of the digital content 118, and rendering of the digital content 118 in the user interface 112 of the display device 114. Although illustrated as implemented locally at the computing device 102, functionality of the content processing system 108 is also configurable as whole or part via functionality available via the network 104, such as part of a web service or "in the cloud." Digital content 118 is configurable in a variety of ways, examples of which include digital images, digital media, digital video, and any other form of content that is configured for rendering for display in a user interface 112 of a display device 114.

An example is shown in FIG. 1 using first and second stages 122 and 124. At the first stage 122, a digital artist interacts with a drawing application via the user interface 112. The user interaction 110 defines a stroke of a digital object 126. An orientation is determined, and a relative amount is calculated based on the orientation. The relative amount is then applied to a visual characteristic of an edit to the digital object 126 in the user interface 112 to define "how much" of the visual characteristic is to be applied as part of the edit. In this case, the visual characteristic is a stroke attribute, e.g., stroke thickness. The digital object 126 is displayed on the display device 114 as having the relative amount applied to the stroke attribute.

In the second stage 124, the digital artist defines a second stroke of a digital object 126. However, in the second stage 122 the orientation of the computing device 102 has been changed. In this case, the computing device 102 has been rotated about the x-axis (i.e., pitch). Because the orientation of the computing device 102 has changed, the relative amount calculated in the second stage 124 is notably different from the relative amount calculated in the first stage 122. The corresponding relative amount is applied to the visual characteristic, which again is stroke thickness. The digital object 126 is then displayed in the user interface 112 as having the relative amount applied, e.g., the stroke is noticeably thicker when compared with the first stage 122.

Figure 2:
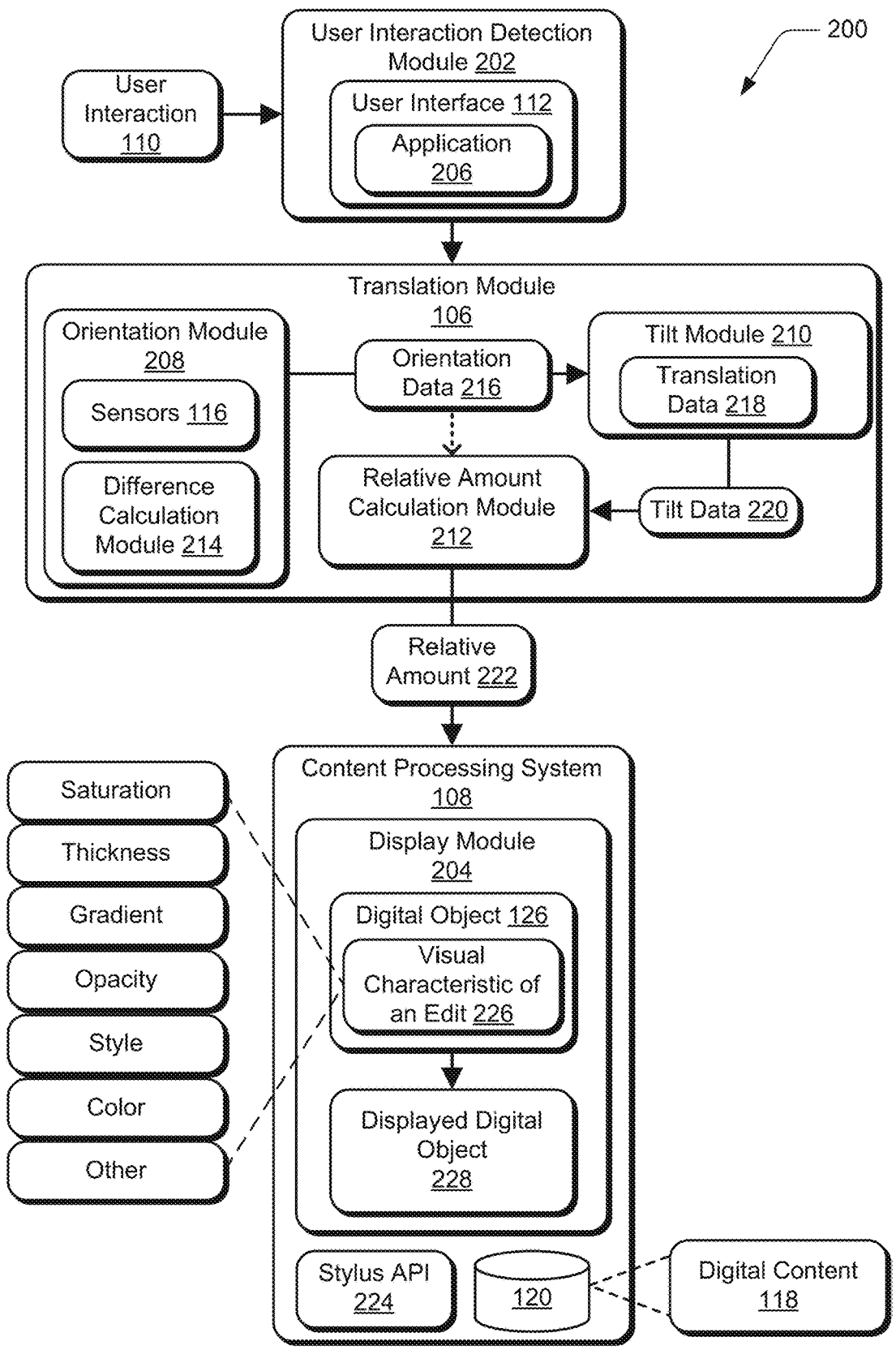
FIG. 2 depicts a system in an example implementation showing operation of a system for leveraging device orientation to modify visual characteristics of edits of FIG. 1 in greater detail.

FIG. 2 depicts a system 200 in an example implementation showing operation of a user interaction detection module 202, a translation module 106, and a content processing system 108 including a display module 204. The user interaction detection module 202 includes the user interface 112 of an application 206. As shown, the user interaction detection module 202 detects a user interaction 110, for instance with the user interface 112 displayed by the application 206.

Responsive to a detected user interaction 110, the translation module 106 determines the orientation. The translation module 106 is illustrated to include an orientation module 208, a tilt module 210, and a relative amount calculation module 212. The orientation module 208 includes a difference calculation module 214, as well as sensors 116 which are used to determine the orientation. In some implementations, the difference calculation module 214 is used to determine orientation data 216 as a difference between a reference orientation and a current orientation as further described with respect to FIG. 5.

In one example, the orientation data 216 is passed to a tilt module 210 which includes translation data 218. The tilt module 210 is operable to translate the orientation data 216 into tilt data 220 as further described with respect to FIG. 7. Once translated, the tilt data 220 is then communicated to the relative amount calculation module 212. In another example, the orientation data 216 is communicated directly to the relative amount calculation module 212 without first being translated by the tilt module 210.

Using either the orientation data 216 or the tilt data 220, the relative amount calculation module 212 calculates a relative amount 222. The relative amount 222 generally represents a quantification related to the orientation of the computing device 102. In one example where the relative amount calculation module 212 receives translated tilt data 220, the calculation of a relative amount 222 includes communication via an API, for instance via a stylus API 224 of the content processing system 108. In this way, the relative amount calculation module 212 is usable to leverage existing functionality of the computing device 102 without making changes to that functionality.

The content processing system 108 applies the relative amount 222 to a visual characteristic of an edit 226 to a digital object 126. In various examples, a visual characteristic of an edit 226 is a stroke attribute, such as saturation, thickness, gradient, opacity, style, color, or other options. In some examples, application of the relative amount 222 to a visual characteristic of an edit 226 includes communication via an API, for instance via a stylus API 224 such that the edit is applied as if received from an active stylus. Once the relative amount 222 is applied, the digital object 126 having the relative amount 222 applied to the visual characteristic of the edit 226 is displayed as the displayed digital object 228 by the display module 204.

Figure 3:
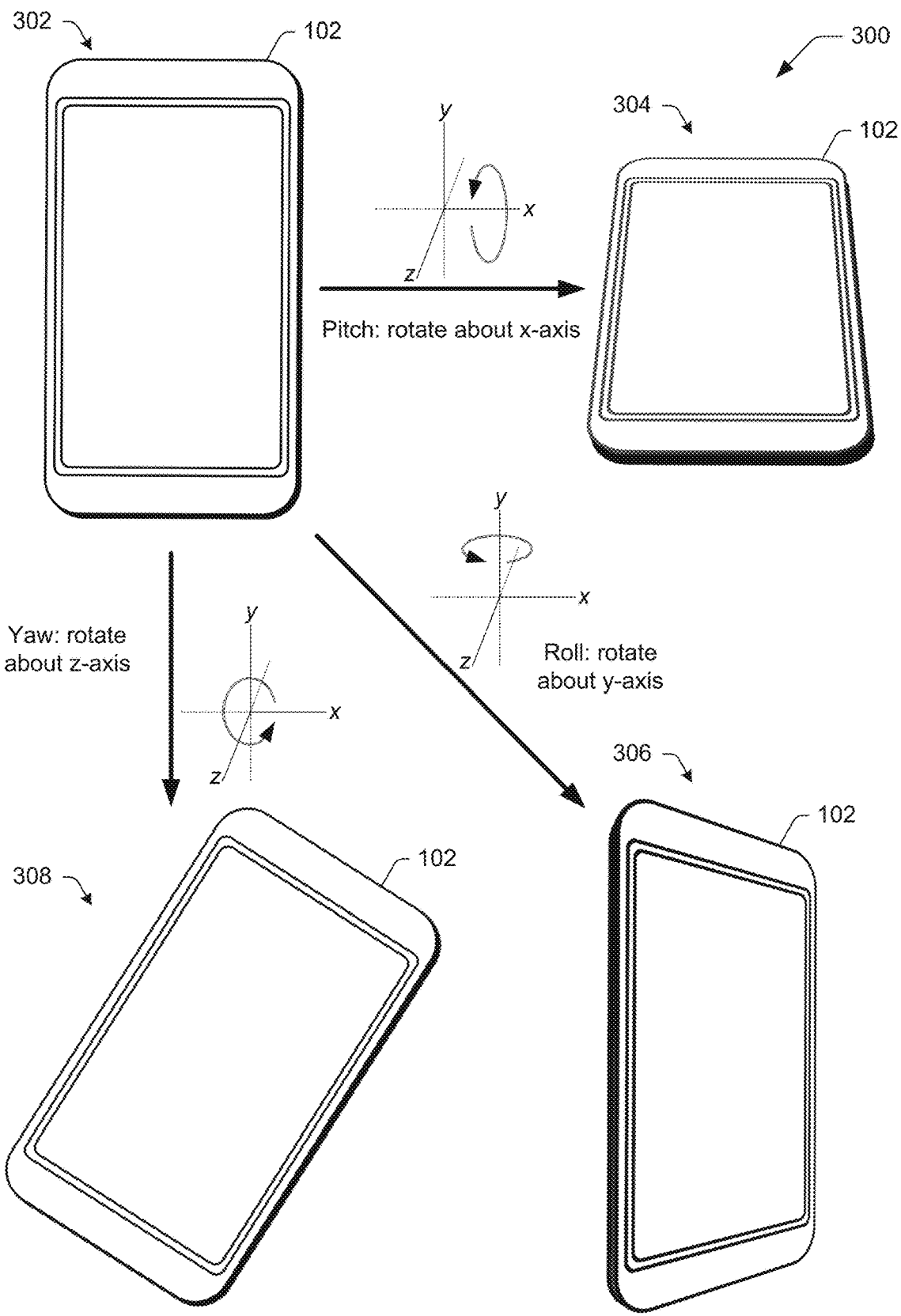
FIG. 3 depicts an example of orientation of a device defined by pitch, roll, and yaw.

FIG. 3 depicts an example 300 of orientation of a device defined by the dimensional movement quantifications of pitch, roll, and yaw. The orientation is depicted using first, second, third, and fourth stages 302, 304, 306, and 308. In example 300, the device is shown in a portrait orientation. In other examples, the reference orientation is defined by a device in a landscape orientation, i.e., rotated 90 degrees. At the first stage 302 the computing device 102 is depicted in a neutral orientation. As further described in FIG. 5, in some implementations, this is set to be a reference orientation.

Progressing from the orientation shown in the first stage 302 to the orientation shown in the second stage 304, the computing device 102 has been rotated about the x-axis, which is described by the pitch. Progressing from the orientation shown in the first stage 302 to the orientation shown in the third stage 306, the device has been rotated about the y-axis which is described by the roll. Progressing from the orientation shown in the first stage 302 to the orientation shown in the fourth stage 308, the computing device 102 has been rotated about the z-axis, which is described by the yaw.

Figure 4:
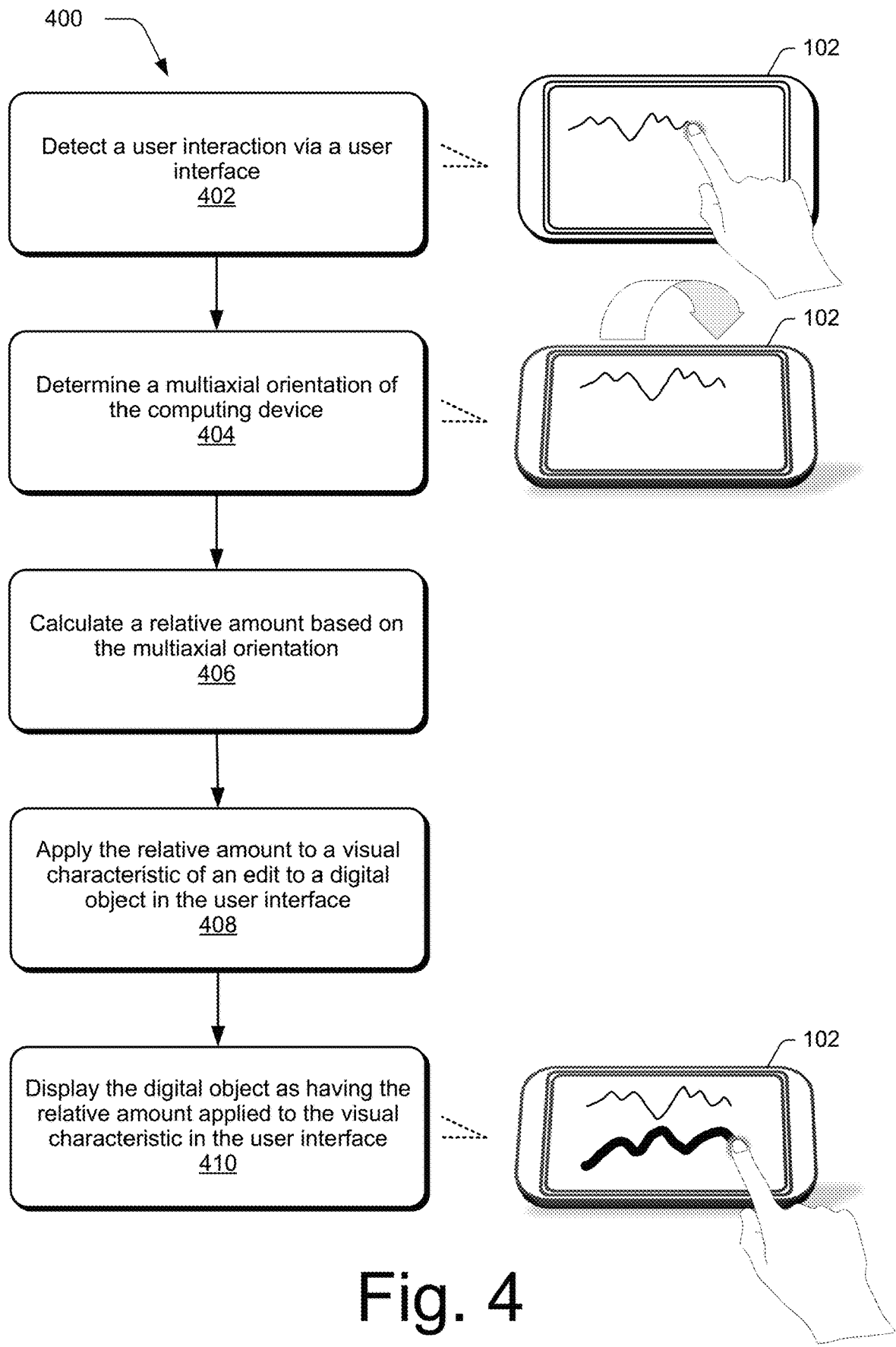
FIG. 4 illustrates an example technique for leveraging device orientation to modify visual characteristics of edits in accordance with one or more implementations described herein.

FIG. 4 illustrates an example technique 400 for leveraging device orientation to modify visual characteristics of edits in accordance with one or more implementations of the techniques described herein. At block 402, the computing device 102 detects a user interaction 110 via a user interface 112. In this example, a digital artist is utilizing a digital drawing application 206 on a smartphone, and the user interaction 110 defines a stroke of a digital object 126. At block 404, responsive to the detected user interaction 110, a multiaxial orientation of the computing device 102 is determined. In some examples, the orientation describes a difference between a reference orientation and a current orientation as further described with respect to FIG. 5. In this example, relative to the orientation at block 402, the computing device 102 has been rotated about the x-axis (i.e., pitch).

From the multiaxial orientation, a relative amount 222 is calculated at block 406. Generally, the relative amount 222 indicates a quantification related to the orientation of the computing device 102. As further described with respect to FIG. 7, in some implementations, calculating the relative amount 222 involves first translating the orientation into tilt data 220, which is representative of data that would otherwise be obtained from an active stylus, i.e., in the form of an altitude angle and azimuth angle detected by sensors of the active stylus.

At block 408, the relative amount 222 is applied to a visual characteristic of an edit 226 to a digital object 126 in the user interface 112. In this example, the visual characteristic is a stroke attribute, particularly a thickness of the stroke. Once the relative amount 222 is applied, the digital object 126 having the relative amount 222 applied to the visual characteristic is displayed in the user interface 112 at block 410.

Figure 5:
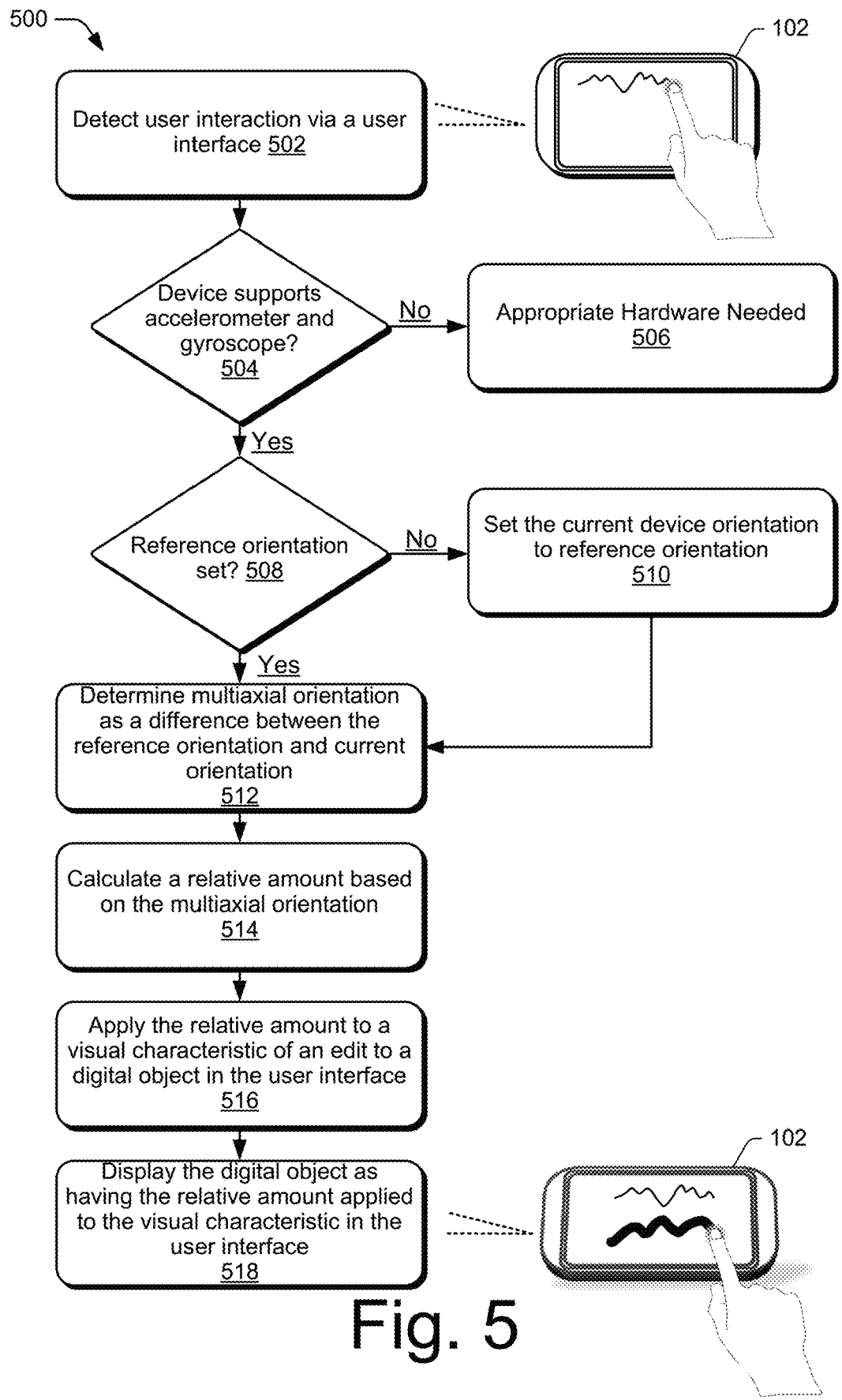
FIG. 5 illustrates an example technique of leveraging device orientation to modify visual characteristics of edits of FIG. 4 in greater detail.

FIG. 5 illustrates an example technique 500 of leveraging device orientation to modify visual characteristics of edits of FIG. 4 in greater detail. At block 502, the computing device 102 detects a user interaction 110 via a user interface 112. In this example, a digital artist utilizes a digital drawing application 206 on a smartphone, and the user interaction 110 defines a stroke of a digital object 126. At block 504, a determination is made as to whether the computing device 102 supports specific sensors 116, in this case an accelerometer and gyroscope. If the computing device 102 does not support an accelerometer and gyroscope, (i.e., "No" from block 504), then appropriate hardware is not available and at block 506 an orientation is not determined. Alternatively, if the computing device 102 does support an accelerometer and gyroscope (i.e., "Yes" from block 504), then a determination is made as to whether or not reference orientation has been set at block 508.

If a reference orientation has not been set, (i.e., "No" from block 508) the computing device 102 sets the current device orientation as the reference orientation at block 510. Accordingly, subsequent deviations in orientation are determined as a difference between the new orientation and the reference orientation, for instance at block 512. Alternatively, if a reference orientation has been set, (i.e., "Yes" from block 508) the computing device 102 determines the multiaxial orientation as a difference between the reference orientation and current orientation at block 512.

From the multiaxial orientation, a relative amount 222 is calculated at block 514. Generally, the relative amount 222 indicates a quantification related to the orientation of the computing device 102. In some implementations, calculating the relative amount 222 involves first translating the orientation into tilt data 220, which is representative of data that would otherwise be obtained from an active stylus.

At block 516, the relative amount 222 is applied to a visual characteristic of an edit 226 to a digital object 126 in the user interface 112. In this example, the visual characteristic is a stroke attribute, particularly a thickness of the stroke. Once the relative amount 222 is applied, the digital object 126 having the relative amount 222 applied to the visual characteristic is displayed in the user interface 112 at block 518. An example application of the example technique 500 is further shown in FIG. 6.

Figure 6:
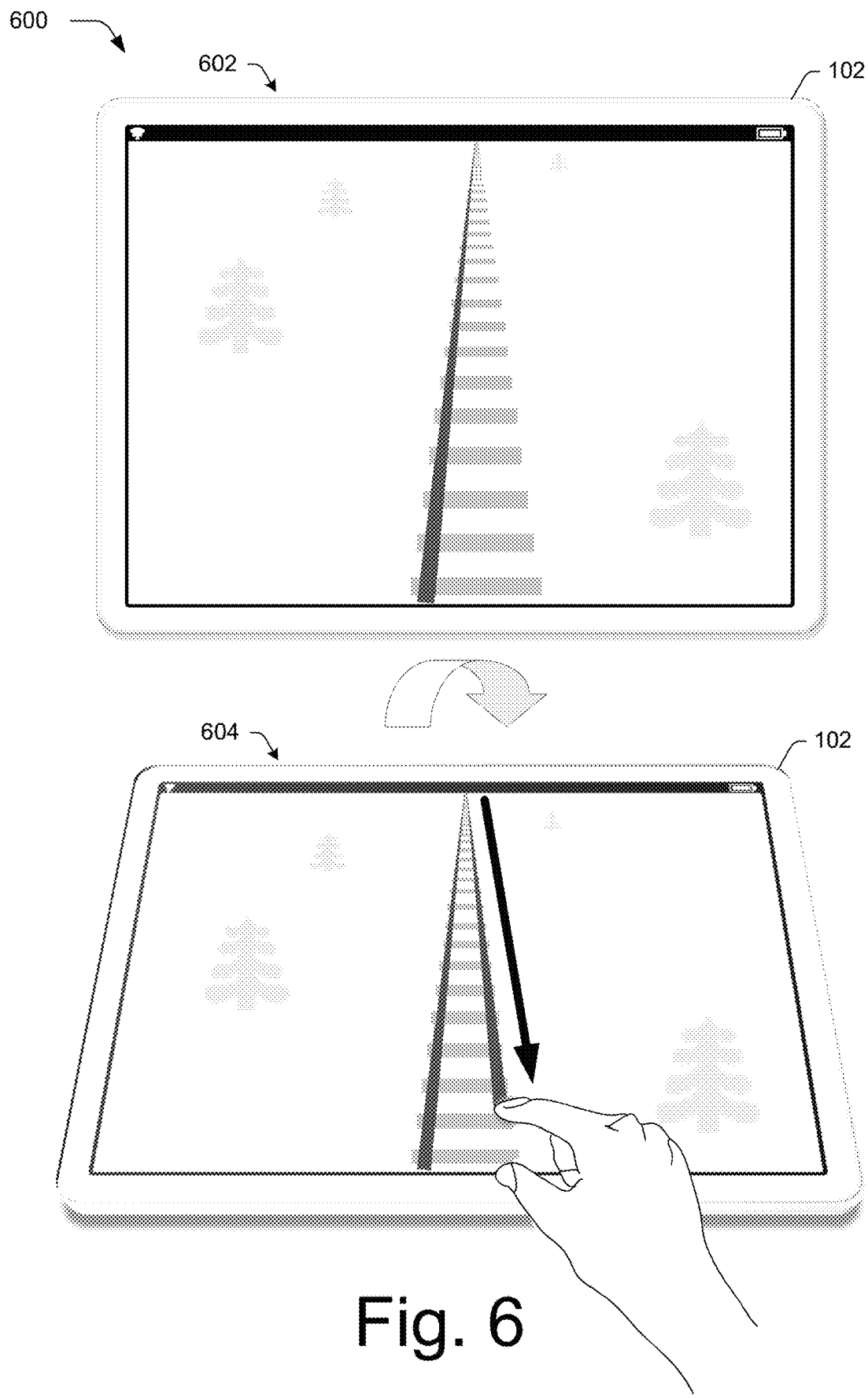
FIG. 6 depicts an example implementation of leveraging device orientation to modify visual characteristics of edits where device orientation controls stroke thickness.

FIG. 6 depicts an example implementation 600 of leveraging device orientation to modify visual characteristics of edits where device orientation controls stroke thickness. In this example, shown in first and second stages 602 and 604, a digital artist utilizes a digital drawing application 206 on a tablet device, and is in the process of drawing a landscape scene including several trees, and a perspective drawing of train tracks. At the first stage 602, the tablet is shown in an upright or neutral position, and the artist has already drawn several trees and most of the train tracks. In progressing from first stage 602 to second stage 604, the tablet device is gradually rotated about the x-axis (i.e., pitch), and the user interaction 110 defines a stroke of a digital object 126.

As the orientation of the tablet changes, so too does the corresponding relative amount 222 that is applied to a visual characteristic of an edit 226 to the digital object 126. In this example, the visual characteristic is the thickness of the stroke. The resulting digital object 126 includes the relative amount 222 applied to the thickness of the stroke and is displayed in the user interface 112. In this way, the ongoing determination of a relative amount 222 and application of the relative amount 222 to a visual characteristic of an edit 226 allows the digital artist to take advantage of continual orientation changes to create gradational effects. For instance, as shown in second stage 604, the stroke gets thicker as the pitch of the tablet continues to increase. Thus, this allows the digital artist to create a perspective drawing intuitively and efficiently.

Gradational change of thickness is used as an example without limitation, and in different implementations gradational changes are applied to any visual characteristic, for instance a thickness, gradient, angle, opacity, saturation, brightness, color, or style of the stroke. This functionality is simply not possible using conventional techniques, for instance, that rely on a passive input, e.g., a passive stylus or finger. Rather, conventional techniques are limited to manual selection of an edit or characteristic, and involve constant resizing, changing of the characteristic, or a result that is not aesthetically pleasing.

Figure 7:
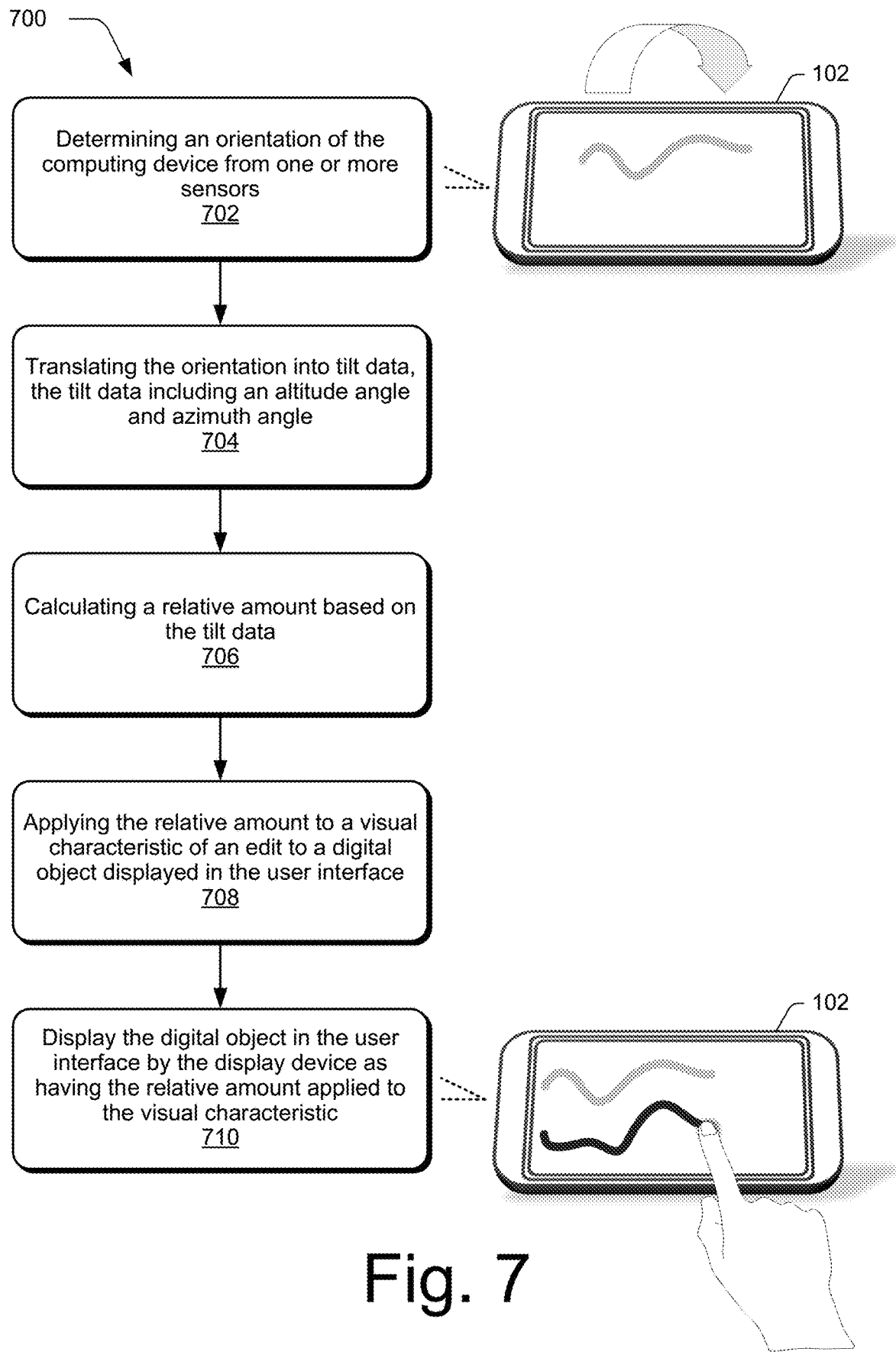
FIG. 7 illustrates an example technique of leveraging device orientation to modify visual characteristics of edits in accordance with one or more implementations described herein.

FIG. 7 illustrates an example technique 700 leveraging device orientation to modify visual characteristics of edits in accordance with one or more implementations described herein. In this example, a stroke is displayed on the user interface 112 that has already been made at a reference orientation. At block 702, a multiaxial orientation of the computing device 102 is determined. Relative to a reference orientation, the computing device 102 has been rotated about the x-axis (i.e., pitch).

In this example at block 704, the orientation is translated to tilt data 220, for instance by mapping the pitch and roll of the computing device 102 to the altitude angle, and mapping the yaw to the azimuth angle. As an example, the pitch and roll are mapped to the altitude angle of a simulated active stylus, in either the portrait or landscape orientation. An orientation input range is set such that users are able to manipulate values without having to move the device drastically (e.g., inputRange=[inputRange$_{start}$, inputRange$_{end}$]). For instance, an input range of 30 to 60 degrees rotation is defined as a comfortable range of user motion. In implementations, the inputRange is varied to accommodate for user preference for the sensitivity of the device. In one example this is performed automatically, while in another example inputRange is user defined. Similarly, an output range is defined as a representation of tilt behavior (e.g., outputRange=[outputRange$_{start}$, outputRange$_{end}$]). In one or more examples, outputRange is set at [0, π/2] to simulate typical tilt behavior.

Following the above example, a correction value is used to ensure that the starting point approximates a middle of the possible output range, as the user generally starts at the optimum orientation. For instance, a correction value is calculated as:

correction Value=(outputRange$_{end}$−outputRange$_{start}$)/2

From the correction Value, corrections are determined for both the pitch and the roll depending on whether the device is in a portrait or landscape mode. For instance:

$$pitchCorrection = \begin{cases} 0; \text{device is in landscape mode} \\ correctionValue; \text{device is in portrait mode} \end{cases}$$

$$rollCorrection = \begin{cases} correctionValue; \text{device is in landscape mode} \\ 0; \text{device is in portrait mode} \end{cases}$$

Accordingly, a tilt value is calculated as:

$$tiltValue = \sqrt{(\text{pitch} + pitchCorrection)^2 + (\text{roll} + rollCorrection)^2}$$

And subsequently, the altitude angle is calculated as:

$$\text{Altitude Angle} = \begin{cases} outputRange_{start}; \\ outputRange_{start} + \\ \frac{outputRange_{end} - outputRange_{start}}{inputRange_{end} - inputRange_{start}} * \\ (tiltValue - inputRange_{start}); \\ outputRange_{end}; \end{cases}$$

where:

$$\begin{cases} outputRange_{start} \leq tiltValue \leq inputRange_{start} \\ inputRange_{start} \leq tiltValue \leq inputRange_{end} \\ inputRange_{end} \leq tiltValue \leq outputRange_{end} \end{cases}$$

In the example technique 700, the yaw is mapped to the azimuth angle. In the example, the azimuth angle represents a "tip" of a simulated active stylus. For instance, as the computing device 102 rotates in the z-axis, the tip of the simulated stylus is also mapped as being rotated. In some embodiments, the azimuth angle is calculated when the orientation of the simulated stylus aligns with the orientation of the computing device 102 in which case a unit vector obtained from the yaw is rotated by 90 degrees about the z-axis. This is done, for instance, using a rotation matrix where $$\theta = \frac{\pi}{2}$$

such mat:

$$Matrix_{rotation} = \begin{bmatrix} \cos(\theta) & -\sin(\theta) & 0 \\ \sin(\theta) & \cos(\theta) & 0 \\ 0 & 0 & 1 \end{bmatrix} = \begin{bmatrix} 0 & -1 & 0 \\ 1 & 0 & 0 \\ 0 & 0 & 1 \end{bmatrix}$$

Applying the rotation matrix to the unit vector for the yaw yields:

$$\begin{bmatrix} azimuthUnitVector_x \\ azimuthUnitVector_y \\ 0 \end{bmatrix} = \begin{bmatrix} \cos(\text{Yaw}) \\ \sin(\text{Yaw}) \\ 0 \end{bmatrix} * \begin{bmatrix} 0 & -1 & 0 \\ 1 & 0 & 0 \\ 0 & 0 & 1 \end{bmatrix} = \begin{bmatrix} -\sin(\text{Yaw}) \\ \cos(\text{Yaw}) \\ 0 \end{bmatrix}$$

Accordingly, the azimuth angle is calculated as:

$$\text{Azimuth Angle} = \tan^{-1} \frac{azimuthUnitVector_y}{azimuthUnitVector_x}$$

In this case, the translated tilt data 220 includes an altitude angle and azimuth angle. This is by way of example and not limitation, and in other examples tilt data 220 is representative of any data that is otherwise detected by sensors of an active stylus. Using the tilt data, a relative amount 222 is calculated at block 706. Generally, the relative amount 222 indicates a quantification related to the orientation of the computing device 102. In some implementations, the relative amount 222 is calculated by communicating the tilt data 220 to an API, for instance via a stylus API 224. That is, using the orientation of the device, the techniques described herein enable functionality that is conventionally dependent on using an active stylus, without the use of an active stylus.

For instance, at block 708, the relative amount 222 is applied to a visual characteristic of an edit 226 to a digital object 126 in the user interface 112. In some examples, the application of the relative amount 222 to a visual characteristic of an edit 226 includes communication via an API, for instance via a stylus API 224. In this example, the visual characteristic is a stroke attribute, in particular a brightness of the stroke. Once the relative amount 222 is applied, the digital object 126 having the relative amount 222 applied to the visual characteristic is displayed in the user interface 112 at block 710. As seen in block 710, the stroke made after the device has been rotated about the x-axis (i.e., pitch) is less bright than the stroke that was made in a reference orientation. An example application of the example technique 700 is further shown in FIG. 8.

Figure 8:
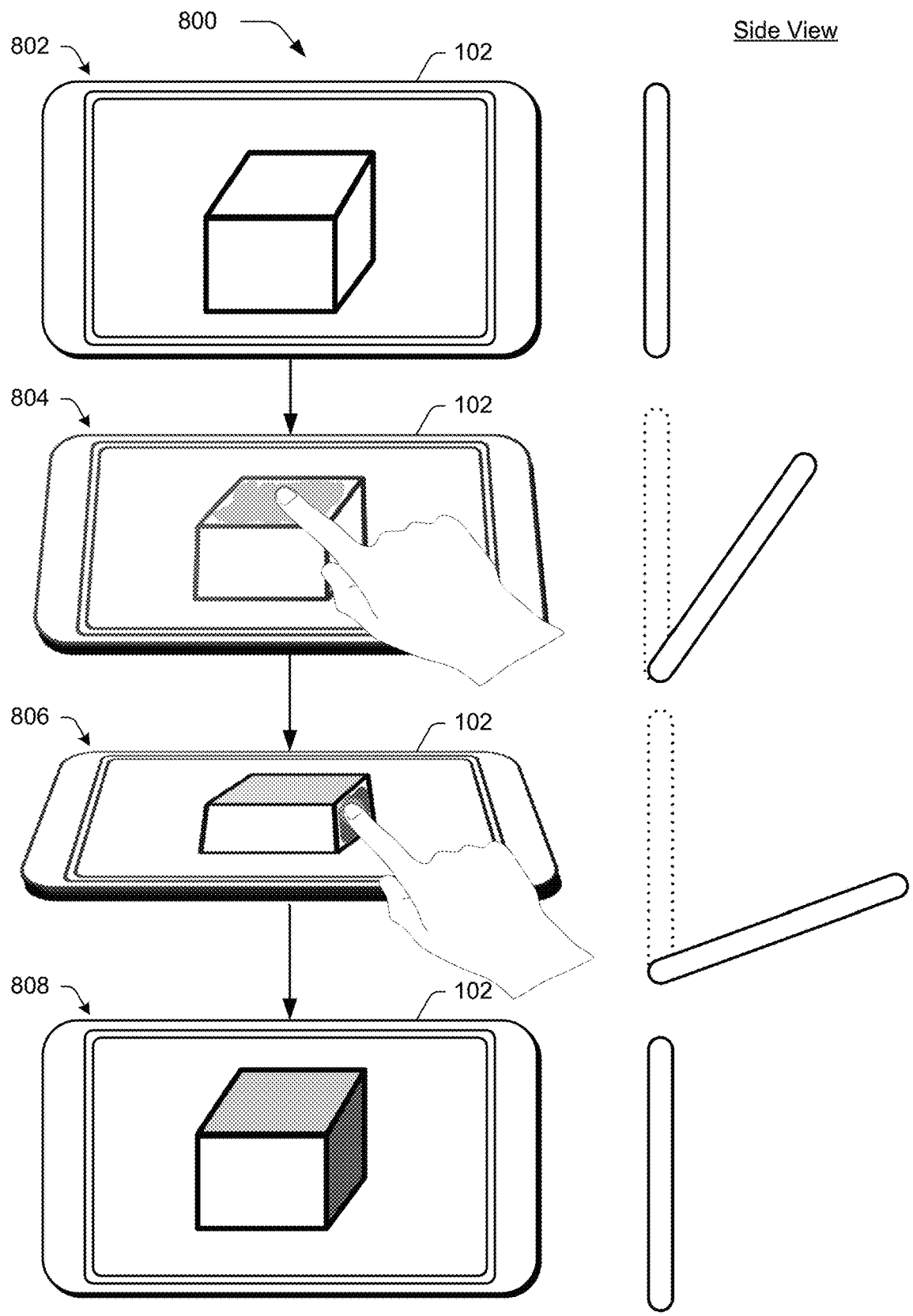
FIG. 8 depicts an example implementation of leveraging device orientation to modify visual characteristics of edits wherein device orientation controls the brightness of a fill operation.

FIG. 8 depicts an example implementation 800 of leveraging device orientation to modify visual characteristics of edits wherein device orientation controls the brightness of a fill operation. In this example, shown in first, second, third, and fourth stages 802, 804, 806, and 808, a digital artist utilizes a digital drawing application 206 on a mobile device, and is in the process of drawing a shaded cube to give the appearance of depth. At the first stage 802, the mobile device is shown in a neutral or reference position, and the artist has already drawn the outline of a cube. In progressing from first stage 802 to second stage 804, the tablet device is rotated slightly about the x-axis (i.e., pitch).

As the orientation of the mobile device changes, so does the corresponding relative amount 222 which is applied to a visual characteristic of an edit 226 to the digital object 126. In this example, the visual characteristic is a brightness of a fill operation of the digital object 126. At the second stage 804, the top layer of the cube is filled in response to the user interaction 110, with the corresponding relative amount 222 applied to the brightness. For instance, the fill operation has a high brightness at a relatively small change in orientation. The resulting digital object 126 as having the relative amount 222 applied to the brightness of the fill operation is displayed in the user interface 112.

Progressing to the third stage 806, the mobile device is further rotated about the x-axis and the user performs another fill operation at the current orientation. At third stage 806, the device is rotated almost 90 degrees, and the relative amount 222 is greater than at the second stage 804. Accordingly, the corresponding relative amount 222 is applied to the visual characteristic of the edit to the digital object 126, in this case brightness of the fill operation. Because the relative amount 222 is greater in the third stage 806 than in the second stage 804, the brightness is lower, and the right face of the cube is filled with a darker color. The resulting digital object 126 as having the relative amount 222 applied to the brightness of the fill operation is displayed in the user interface 112. At 808, the mobile device is returned to a neutral or reference position, and the cube has been successfully shaded by the digital artist.

Figure 9:
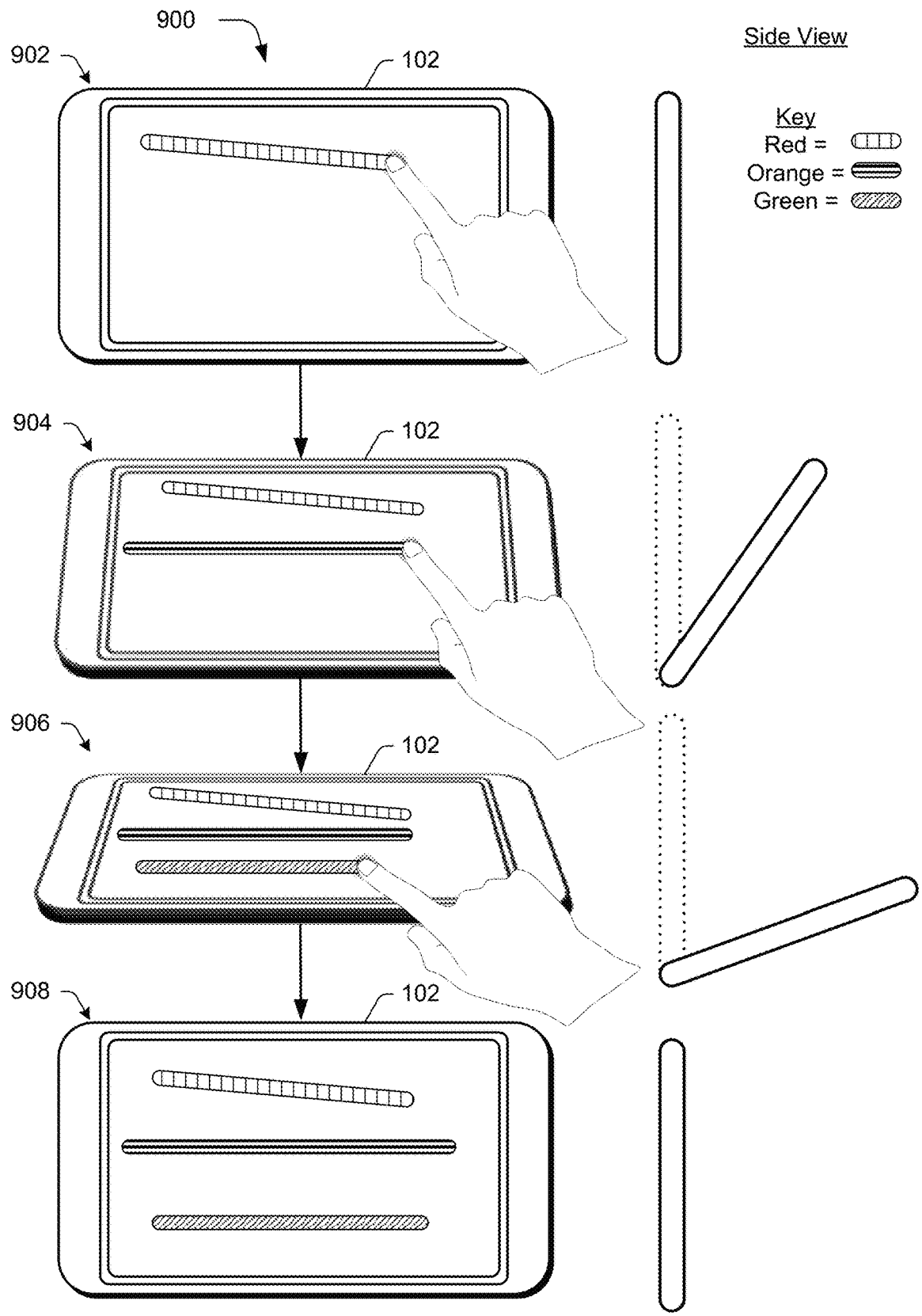
FIG. 9 depicts an example implementation of leveraging device orientation to modify visual characteristics of edits wherein device orientation controls the color of a stroke.

FIG. 9 depicts an example implementation 900 of leveraging device orientation to modify visual characteristics of edits wherein device orientation is used to control a color of a stroke. In this example, shown in first, second, third, and fourth stages 902, 904, 906, and 908, a digital artist utilizes a digital drawing application 206 on a mobile device. As shown in the key, in this illustration a stroke with vertical lines represents the color red, a stroke with horizontal lines represents the color orange, and a stroke with diagonal lines represents the color green. At the first stage 902, the mobile device is shown in a neutral or reference position, and the artist has just completed a stroke, the stroke appearing red, represented by vertical lines. In progressing from the first stage 902 to the second stage 904, the tablet device is rotated slightly about the x-axis (i.e., pitch).

As the orientation of the mobile device changes, so does the corresponding relative amount 222 which is applied to a visual characteristic of an edit 226 to the digital object 126. In this example, the visual characteristic is a stroke attribute, particularly a color of the stroke. At the second stage 904, the user interaction 110 defines a second stroke. The resulting digital object 126 as having the relative amount 222 applied to the color of the stroke is displayed in the user interface 112. Because of the change in the relative amount 222, the stroke is orange at this orientation, represented by horizontal lines. As further discussed with respect to FIG. 10, in some examples a range of change of the relative amount 222 is defined such that a change in orientation allows for more subtle, or more drastic changes to the visual characteristic.

Progressing to the third stage 906, the mobile device is further rotated about the x-axis and the user interaction 110 defines a third stroke. At the third stage 906, the device is rotated almost 90 degrees, and the relative amount 222 is greater than at the second stage 904. Accordingly, the corresponding relative amount 222 is applied to the visual characteristic of the edit to the digital object 126, in this case color of the stroke. The resulting digital object 126 as having the relative amount 222 applied to the color of the stroke is displayed in the user interface 112. Because of the change in the relative amount 222, the stroke is green at this orientation represented by diagonal lines. At the fourth stage 908, the mobile device is returned to a neutral or reference position, with the three strokes displayed. In this way the techniques described herein allow a user to intuitively and efficiently manipulate visual characteristics appearing in a user interface 112, whereas conventional methods are reliant on an active stylus or time-intensive manual selection of visual features.

Figure 10:
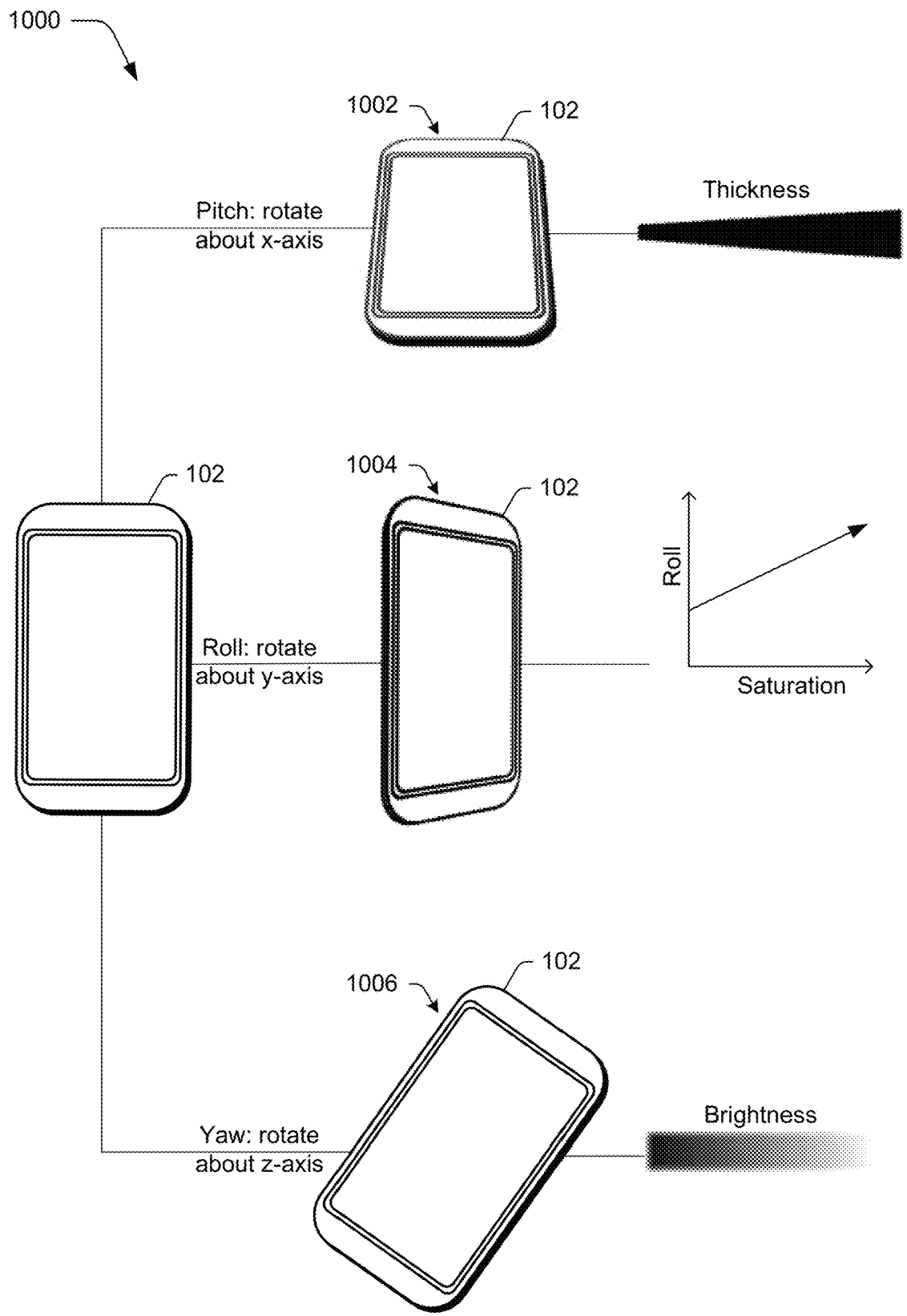
FIG. 10 depicts an example implementation of leveraging device orientation to modify visual characteristics of edits wherein pitch controls the thickness of a stroke, roll controls saturation of a stroke, and yaw controls brightness of a stroke.

FIG. 10 depicts an example implementation 1000 of leveraging device orientation to modify visual characteristics of edits wherein pitch controls the thickness of a stroke, roll controls saturation of a stroke, and yaw controls brightness of a stroke. In this example, each dimensional movement quantification (pitch, roll, and yaw) relates to a different visual characteristic. In some implementations, the visual characteristic that each dimensional movement quantification relates to are user defined, such that a user has control over which visual characteristic is manipulated by a change in orientation. A relative amount 222 is calculated for each of the pitch, roll, and yaw, such that the relative amount 222 for each is applied to a different respective visual characteristic of an edit 226 to a digital object 126.

By way of example and not limitation, the relative amount 222 for each of the pitch, roll, and yaw are calculated as follows. Here, the orientation is represented by variableAngle, which contains dimensional movement quantifications for pitch, roll and yaw. A range of change is set by a user, which allows a user to create subtle changes in the color or other visual characteristics simply by moving the computing device 102 in a certain direction. The range of change, for instance, is defined as [range$_{start}$, range$_{end}$]. The relative amount 222 is calculated as:

$$\text{Relative Amount} = range_{start} + \frac{inputAngle}{(variableAngle_{end} - variableAngle_{start})} * (range_{end} - range_{start})$$

Where, for instance, variableAngle has a range of [−π, π] for the roll, [−π/2, π/2] for the pitch, and [−π, π] for the yaw, which is generally representative of the comfortable range of change for a user.

Once a relative amount 222 is calculated, for instance for each of the pitch, roll, and yaw, individually, the respective relative amount 222 for each is applied to a different respective visual characteristic of an edit 226 to a digital object 126. Subsequently, the digital object 126 with the relative amount 222 applied is displayed in the user interface 112. In the example implementation 1000, for instance, as shown at a first example 1002, the pitch relates to a thickness of a stroke. That is, as the computing device 102 is rotated about the x-axis, the thickness of the stroke changes accordingly. As shown at a second example 1004, the roll relates to a saturation of a stroke. That is, as the computing device 102 is rotated about the y-axis, the saturation of the stroke changes accordingly. In this example, as the roll increases the saturation of the stroke also increases. As shown at a third example 1006, the yaw relates to a brightness of a stroke. That is, as the computing device 102 is rotated about the z-axis, the brightness of the stroke changes accordingly, for instance as shown here gradationally changing from dark to light.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example System and Device

Figure 11:
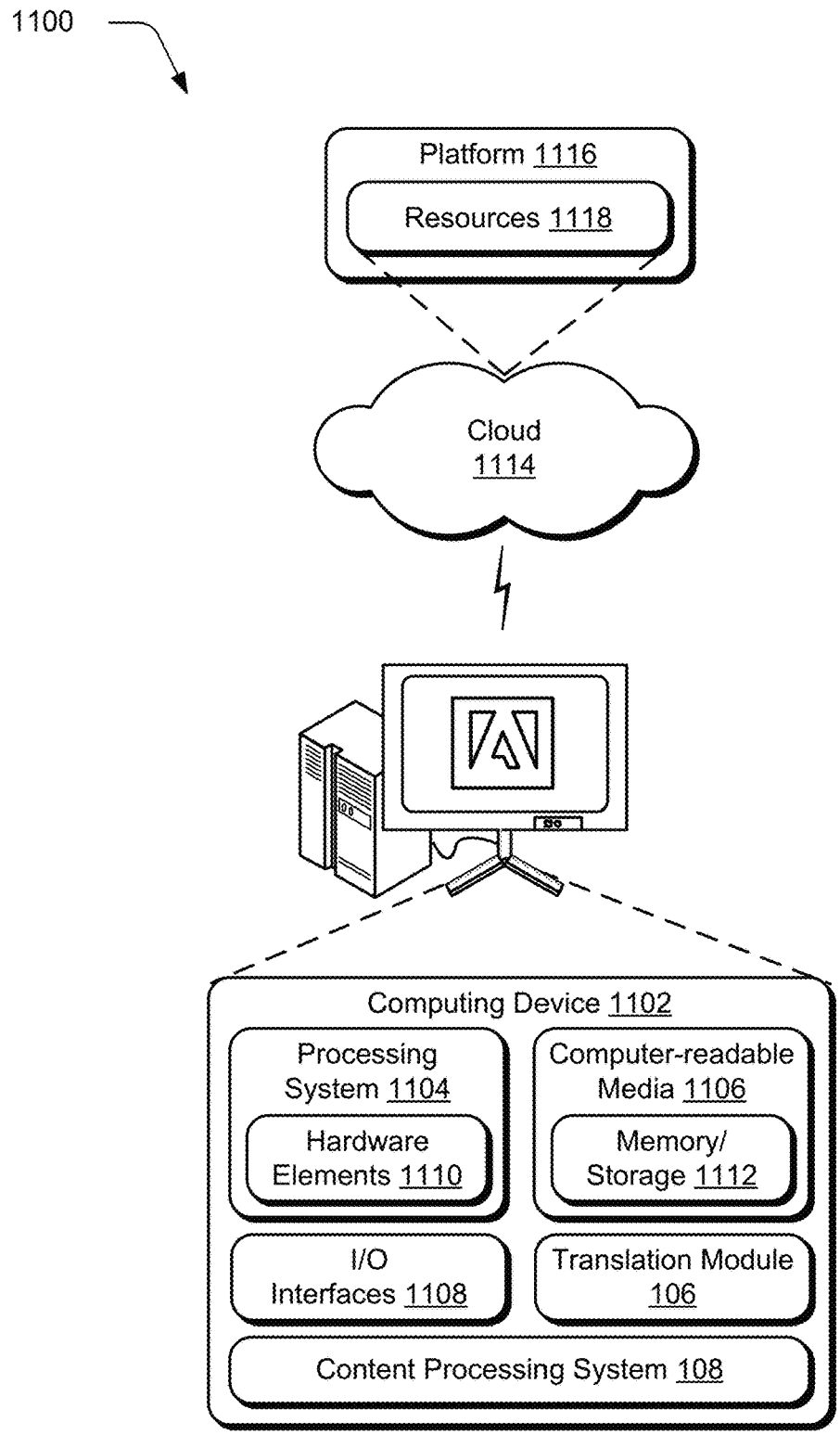
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the translation module 106 and the content processing system 108. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices 1102 and/or processing systems 1104) to implement techniques, modules, and examples described herein.

The techniques described herein are supported by various configurations of the computing device 1102 and are not limited to the specific examples of the techniques described herein. This functionality is also implementable all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

CONCLUSION

Although implementations of systems for leveraging device orientation to modify visual characteristics of edits have been described in language specific to structural features and/or methods, it is to be understood that the appended claims are not necessarily limited to the specific features or methods described. Rather, the specific features and methods are disclosed as example implementations of systems for leveraging device orientation to modify visual characteristics of edits, and other equivalent features and methods are intended to be within the scope of the appended claims. Further, various different examples are described and it is to be appreciated that each described example is implementable independently or in connection with one or more other described examples.

What is claimed is:

1. In a digital medium environment, a method implemented by a computing device, the method comprising:
   detecting, by the computing device, a user interaction via a user interface of the computing device;
   determining, by the computing device and responsive to the detected user interaction, a multiaxial orientation of the computing device;
   calculating, by the computing device, more than one relative amount based on different dimensional movements of the multiaxial orientation;
   applying, by the computing device, at least one of the relative amounts to a visual characteristic of an edit to a digital object in the user interface; and
   displaying, by the computing device, the digital object as having the at least one relative amount applied to the visual characteristic in the user interface.

2. The method as described in claim 1, wherein the multiaxial orientation describes a difference between a current orientation of the computing device and a reference orientation of the computing device.

3. The method as described in claim 1, wherein the multiaxial orientation is defined by a pitch, roll, and yaw of the computing device relative to a reference orientation.

4. The method as described in claim 3, wherein calculating the relative amount includes:
   mapping the pitch and roll of the computing device to an altitude angle; and
   mapping the yaw of the computing device to an azimuth angle.

5. The method as described in claim 1, wherein the user interaction defines a stroke of the digital object and the visual characteristic is a stroke attribute.

6. The method as described in claim 5, wherein the stroke attribute is a thickness, gradient, opacity, style, or color of the stroke.

7. The method as described in claim 1, wherein the multiaxial orientation is determined from one or more sensors of the computing device.

8. The method as described in claim 7, wherein the one or more sensors includes one or more of an accelerometer, passive infrared sensor, gyroscope, digital camera, ultrasonic sensor, microwave sensor, or tomographic sensor.

9. The method as described in claim 3, further comprising calculating respective relative amounts individually for the pitch, roll, and yaw and applying the respective relative amounts to different respective visual characteristics.

10. A device comprising:
   a display device configured to display a user interface;
   one or more sensors; and
   a translation module implemented at least partially using a processing system and a computer-readable storage medium, the translation module configured to perform operations comprising:
      determining an orientation of the device based on data received from the one or more sensors;
      translating the orientation into tilt data, the tilt data including an altitude angle and azimuth angle;
      calculating a relative amount based on the tilt data; and
   a content processing system implemented at least partially using the processing system and the computer-readable storage medium, the content processing system configured to perform operations comprising:
      applying the relative amount to a visual characteristic of an edit to a digital object displayed in the user interface; and displaying the digital object in the user interface by the display device as having the relative amount applied to the visual characteristic.

11. The device as described in claim 10, wherein the orientation describes an angle of the device in three-dimensional space.

12. The device as described in claim 10, wherein the orientation describes a change in multiaxial orientation of the device between a reference orientation and a current orientation.

13. The device as described in claim 10, wherein the orientation is defined by a pitch, roll, and yaw of the device relative to a reference orientation.

14. The device as described in claim 13, wherein the translating the orientation into tilt data includes mapping the pitch and roll of the device to the altitude angle and mapping the yaw of the device to the azimuth angle.

15. The device as described in claim 10, wherein the digital object defines a stroke and the visual characteristic is a stroke attribute.

16. The device as described in claim 10, wherein applying the relative amount includes communicating the tilt data to a stylus API.

17. One or more computer-readable storage media comprising stored instructions that, responsive to execution by a computing device, causes the computing device to perform operations including:

determining a multiaxial orientation of the computing device using one or more multiaxial sensors to detect roll, pitch, and yaw of the computing device;

calculating more than one relative amount based on the roll, pitch, and yaw;

applying at least one of the relative amounts to a visual characteristic of an edit to a digital object in a user interface; and displaying the digital object in the user interface as having the at least one relative amount applied to the visual characteristic.

18. The one or more computer-readable storage media as described in claim 17, further comprising:

calculating respective relative amounts individually for the pitch, roll, and yaw; and applying the respective relative amounts to different respective visual characteristics.

19. The one or more computer-readable storage media as described in claim 18, wherein the respective relative amounts for pitch, roll, and yaw are user configurable to edit the different respective visual characteristics of the digital object.

20. The one or more computer-readable storage media as described in claim 17, wherein the digital object defines a stroke and the visual characteristic is an RGB color value of the stroke.

* * * * *